United States Patent [19]
Arisaka

[11] 3,961,345
[45] June 1, 1976

[54] OPENING AND CLOSING MEANS FOR ELECTRICALLY CONTROLLED SHUTTERS

[75] Inventor: Kunio Arisaka, Urawa, Japan

[73] Assignee: Copal Company Limited, Japan

[22] Filed: July 8, 1974

[21] Appl. No.: 486,648

[30] Foreign Application Priority Data
July 9, 1973  Japan.................. 48-77361

[52] U.S. Cl................... 354/234; 354/50; 354/247
[51] Int. Cl.².............. G03B 9/40; G03B 9/58
[58] Field of Search............ 354/48, 50, 51, 60 R, 354/234, 266, 245, 246, 247

[56] References Cited
UNITED STATES PATENTS

| | | |
|---|---|---|
| 3,645,186 | 2/1972 | Kitai .................................... 354/51 |
| 3,705,536 | 12/1972 | Termann............................. 354/51 |
| 3,722,291 | 3/1973 | Kitai ................................ 354/51 X |
| 3,722,392 | 3/1973 | Kitai .................................... 354/50 |
| 3,820,131 | 6/1974 | Tanako ............................ 354/50 X |

Primary Examiner—Joseph F. Peters, Jr.
Attorney, Agent, or Firm—Cushman, Darby & Cushman

[57] ABSTRACT

An opening and closing means for electric shutters comprising a single actuating member capable of controlling, during its movement in one direction, both of opening and closing of shutter blades for the purpose of providing a shutter of simple construction and low cost. Said electric shutter comprises a release member capable of keeping a power switch in closed state during operation of the shutter, said release member being locked in the position where it is released by said actuating member.

3 Claims, 6 Drawing Figures

OPENING AND CLOSING MEANS FOR ELECTRICALLY CONTROLLED SHUTTERS

BACKGROUND OF THE INVENTION

1. Field of the invention:

The present invention relates to an electric shutter for cameras and, more particularly, to an opening and closing means for an electric shutter arranged to open and close shutter blades during the time when an actuating member moves in one direction.

2. Description of the prior art:

Conventional opening and closing means for electric shutters are arranged, for example, as follows. That is, separate actuating members, one of which being exclusively for opening of shutter blades and the other being for closing of shutter blades, and actuating power sources respectively connected to said actuating members are provided. When cocking the shutter, the above-mentioned two actuating power sources are charged at the same time and the above-mentioned two actuating members are locked by an opening release member and closing release member respectively.

Said kind of opening and closing means requires two actuating power sources as described in the above and, at the same time, two release members have to be provided. Consequently, the mechanism of such opening and closing means becomes complicated, the cost of production becomes high and the overall structure becomes large. Moreover, if the closing release member is directly engaged with an electro-magnet as an armature in said type of opening and closing means, a gap sometimes occurs between the closing release member serving as an armature and electro-magnet because of an impact caused when the cocking member returns, for example in case of such opening and closing means for a shutter for which shutter cocking operation is carried out in combination with film winding operation of the camera, because of the relation to the other related members and, consequently, misoperation is sometimes caused by the above. Therefore, an armature member engageable with the closing release member is generally provided separetely so that it contacts the electro-magnet, and movement is transmitted to the closing actuating member through the closing release member. As a result, however, construction of the opening and closing means becomes more complicated.

On the other hand, regarding the power switch, there has been a problem as described below. That is, if the power switch is arranged relative only to the release member of the camera, the electric power source of the exposure control circuit is turned off when the pressure to the release member is released halfway in case of a long-time exposure. As a result, proper exposure is not attained. To solve the above problem, it is known to provide one switch relative to the release member and, at the same time, to provide another switch relative to a part of the shutter mechanism, said two switches being connected in series or parallel. In such arrangement, it is necessary to accurately adjust the opening and closing timing of two switches and the number of required parts becomes large. Consequently, the cost of production becomes high.

SUMMARY OF THE INVENTION

It is, therefore, the primary object of the present invention to provide an opening and closing means for electric shutters especially suitable for small-sized cameras for using 16 mm films having a simple construction and can be produced at a low cost.

Another object of the present invention is to provide an opening and closing means for electric shutters arranged to reliably hold the electric power switch in the closed position only during operation of the shutter without providing a special locking means.

Still another object of the present invention is to provide an opening and closing means for electric shutters capable of making the shutter always display its high performance even when slight machining error and/or assembling error is caused in component members.

DETAILED DESCRIPTION OF PREFERRED EMBODIMENT

Figure 1:
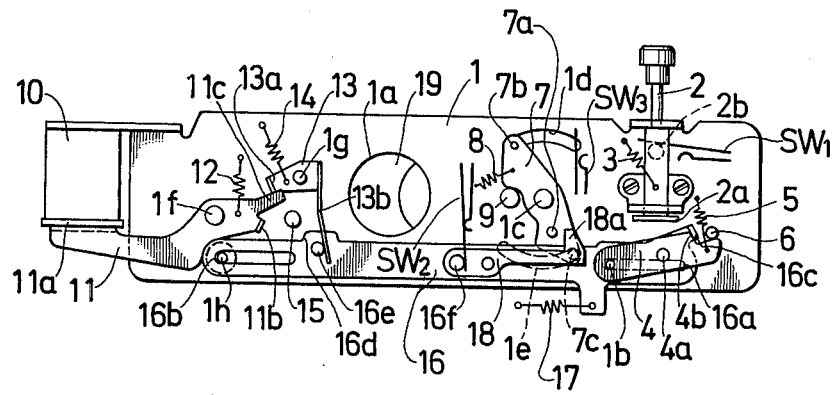
FIG. 1 shows a plan view of an embodiment of the shutter according to the present invention in its cocked state.
Figure 2:
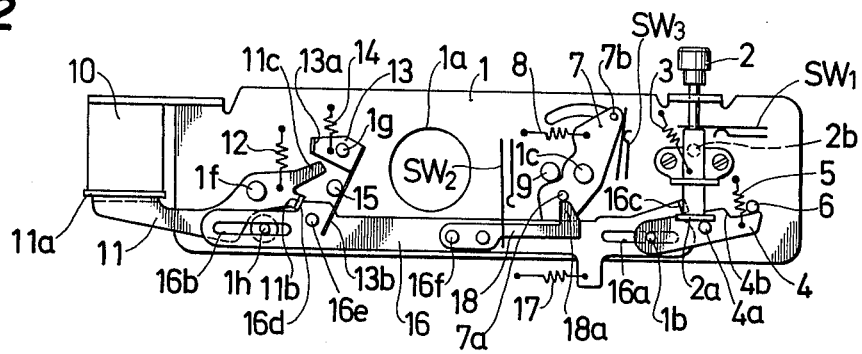
FIG. 2 shows a plan view of the shutter shown in FIG. 1 in its fully opened state.
Figure 3:
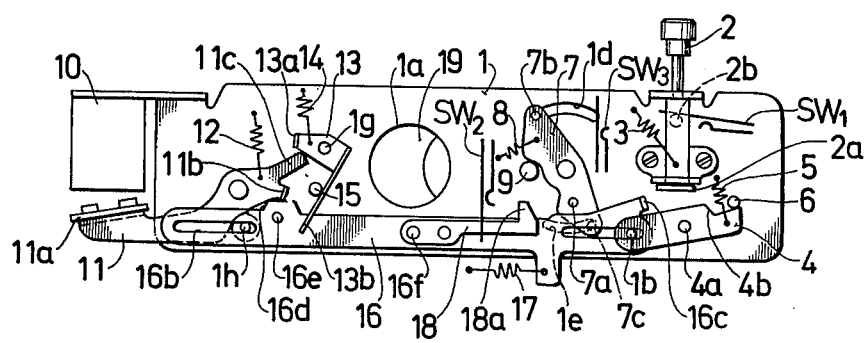
FIG. 3 shows a plan view illustrating the state of the shutter shown in FIG. 1 at the time when the opening and closing operation is completed.

In the following, the present invention is described in detail according to the illustrated embodiment. In FIGS. 1 through 3, numeral 1 designates a base plate in which an aperture 1a is formed. Numeral 2 designates a release member movably supported by said base plate 1 and biased upward by a spring 3. At the lower end of the release member 2, a locking plate 2a is attached and a pin 2b, the circumference thereof being insulated, is attached at the middle portion of the release member 2. Numeral 4 designates a locking lever having a pin 4a engageable with the locking plate 2a of said release member 2 and having a stepped portion 4b. The locking lever 4 is pivoted to a pin 1b fixed to the base plate 1 and is biased counterclockwise by a spring 5. Numeral 6 designates a stopper which limits the counterclockwise movement of the locking lever 4. Numeral 7 designates an opening and closing member comprising a lever pivoted to a pin 1c fixed to the base plate 1, the lever being biased counterclockwise by a spring 8. Besides, the opening and closing lever 7 has a pin 7a, 7b and 7c, pins 7b and 7c being projected to the back side of the base plate 1 respectively through arcuate slots 1d and 1e formed in the base plate 1. Numeral 9 designates a stopper for limiting the moving range of said opening and closing lever. Numeral 10 designates an electro-magnet mounted to the base plate 1. Numeral 11 designates an armature lever pivoted to a pin 1f fixed to the base plate 1 and is biased counterclockwise by a spring 12. An armature plate 11a is formed at one arm of the armature lever 11 and a bent portion 11b and engaging portion 11c are formed at the other arm. Numeral 13 designates a holding member pivoted to a pin 1g fixed to the base plate 1 and is biased clockwise by a spring 14. The holding member 13 has a bent portion 13a formed at one arm and a resilient tongue portion 13b at the other arm. (It is also possible to make the holding member 13 itself by a resilient material.) Numeral 15 designates a stopper for limiting the clockwise movement of the holding member 13. Numeral 16 designates an actuating member having slots 16a and 16b respectively engaging with said pin 1b and a pin 1h which is fixed to the base plate 1. The actuating member 16 is movable sidewise and is biased leftward by a spring 17. Besides, said actuating member 16 has a bent portion 16c engageable with the locking plate 2a of the release member 2 and the stepped portion 4b of the locking lever 4, a cam portion 16d engageable with the bent portion 11b of the armature lever 11, a pin 16e engageable with the tongue portion 13b of the holding member 13 and a pin 16f. Numeral 18 designates a resilient operating member one end of which is fixed to said actuating member 16. At the other end of the operating member 18, a hook portion 18a is formed. Said hook portion 18a has a sloped surface which is sloped upward toward the right when FIGS. 1 through 3 are seen from above. Said sloped surface of the hook portion 18a is arranged so that the hook portion will engage with the pin 7a of the opening and closing lever 7 when the actuating member 16 moves leftward in order to turn the lever 7 clockwise and that, when the actuating member 16 moves rightward, the operating member 18 can pass the pin 7a by moving over the top surface of the pin 7a. Reference symbol $SW_1$ represents a power switch of an exposure control circuit according to known art but not illustrated, said switch $SW_1$ being engageable with the pin 2b of the release member 2. Reference symbol $SW_2$ represents a start switch for a delaying circuit of said exposure control circuit, said switch $SW_2$ being engageable with the pin 16f of the actuating member 16. Reference symbol $SW_3$ represents a synchronous switch according to known art for flashlight.

Figure 4A:
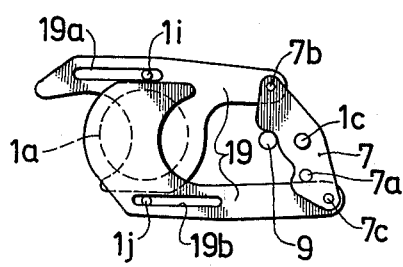
FIG. 4a and FIG. 4b respectively show explanatory views illustrating shutter blades in closed state and opened state.
Figure 4B:
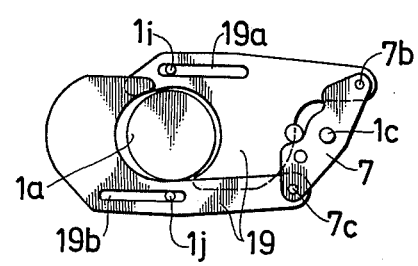

As it is shown in detail in FIGS. 4a and 4b, numeral 19 designates a pair of shutter blades arranged on the back side of the base plate 1. A part of each blade is pivoted to one of pins 7b and 7c of the opening and closing lever 7. At another part of each blade, slots 19a and 19b are respectively formed for fitting respectively to pins 1i and 1j fixed to the base plate 1. Thus, blades 19 serve to open and close the aperture 1a according to movement of the opening and closing lever 7.

The operation of the opening and closing means arranged as above is described below. When the release member 2 is pushed downward, in the cocked state shown in FIG. 1, against the spring 3, the power switch $SW_1$ is closed at first, the electro-magnet 10 is energized and the armature lever 11 is attracted by the electro-magnet 10 and is held in the position shown in FIG. 1.

When the release member 2 is further pushed down, the locking plate 2a engages with the pin 4a and turns the locking lever 4 clockwise. Consequently, the stepped portion 4b of the locking lever 4 is disengaged from the bent portion 16c of the actuating member 16 and the actuating member 16 moves linearly leftward from the position shown in FIG. 1. By the above, the start switch $SW_2$ is opened and, at the same time, the hook portion 18a of the operating member 18 engages with the pin 7a of the opening and closing lever 7 to turn the opening and closing lever 7 clockwise. Thus, shutter blades 19 are opened. In case that the electro-magnet 10 is still kept energized at the time when shutter blades 19 fully open the aperture 1a as shown in FIG. 2, the bent portion 11b of the armature lever 11 engages with the cam portion 16d of the actuating member 16 and stops the movement of the actuating member 16. Therefore, the shutter is held in the fully opened position (FIG. 4b). At that time, the synchronous switch $SW_3$ is closed by the opening and closing lever 7, the pin 7a of the opening and closing lever 7 is held by the top surface of the hook portion 18a of the operating member 18, and the bent portion 16c of the actuating member 16 is engaged with the locking plate 2 of the release member 2. Therefore, the release member 2 is held at the released position and the power switch $SW_1$ is kept closed. Besides, the holding member 13 turns clockwise because the tongue portion 13b is disengaged from the pin 16e of the actuating member 16, thus the holding member 13 is disengaged from the armature member 11.

When the electro-magnet 10 is de-energized after a proper exposure time, the armature lever 11 turns counterclockwise as shown in FIG. 3. Therefore, the actuating member 16 is disengaged from the armature lever 11 and further moves linearly leftward from the position shown in FIG. 2 to its final position. At the early stage in that moving stroke, the pin 7a of the opening and closing lever 7 is disengaged from the hook portion 18a and, therefore, the opening and closing lever 7 is turned counterclockwise by the spring 8 and the shutter is closed. Besides, at that time, the locking plate 2a is released from the bent portion 16c. Therefore, the release member 2 returns to the position shown in FIG. 1 and the power switch $SW_1$ is opened. Thus, the opening and closing operation of the shutter is completed. At that time, the locking plate 2a is positioned out of the orbit of movement of the bent portion 16c.

The shutter is to be charged by moving the actuating member 16 rightward from the position shown in FIG. 3 to the position shown in FIG. 1 and the actuating member 16 is held in the cocked state shown in FIG. 1 as said actuating member 16 is locked by the locking lever 4.

Figure 5:
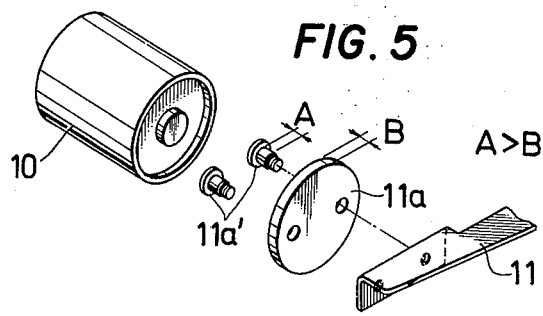
FIG. 5 shows a perspective view illustrating detailed construction of the electro-magnet and armature member.

FIG. 5 shows detailed construction of the electro-magnet and armature member. For example, in this figure, the electro-magnet 10 is formed to have a cylindrical shape and the armature plate 11a of the armature lever 11 is formed to have a disk shape. If, in this case, the fitting length A of fixing screws 11a' is selected to become slightly larger than the thickness B of the armature plate 11a as shown in FIG. 5 and the armature plate 11a is mounted to the armature lever 11 so that a slight play is caused between them, the armature plate 11a will be capable of contacting the magnetic pole portion of the electro-magnet 10 always by surface-to-surface contact even when errors are caused to some extent in manufacture and assembling and, therefore, it is very convenient in practice.

In the above-mentioned embodiment, the actuating member 16 is arranged to perform linear movement. When, however, the actuating member is formed in an arcuate shape and is arranged to move along that arc, the opening and closing means according to the present invention can be applied to a shutter which is arranged to form a circular shape as a whole. In that case, the actuating member may be related to a sector ring to which a returning spring is applied.

I claim:
1. An opening and closing means for electric shutters comprising a pair of shutter blades arranged so as to move substantially in parallel with and in directions reverse to each other; a shutter blade opening and closing member connected to said pair of shutter blades so as to move said pair of shutter blades at the same time in reverse directions during movement of said opening and closing member; an actuating member having thereon an operating member engageable with said shutter blade opening and closing member and arranged (a) to open said blades by engaging with said shutter blade opening and closing member during a first segment of linear movement in one direction of said actuating member and (b) to close said blades by disengaging from said shutter blade opening and closing member during a remaining segment of linear movement in said one direction; an electromagnet located adjacent to said actuating member and arranged to be kept energized during a predetermined exposure time; and an armature member operatively related to said electromagnet and adapted to hold said actuating member, at the end of said first segment of linear movement of said actuating member and while said electromagnet remains energized, and to release said actuating member for said remaining segment of linear movement at the time when said electromagnet is de-energized at the end of said exposure time.

2. An opening and closing means for electric shutters according to claim 1 further comprising a release member for releasing said shutters, said release member being engageable with said actuating member and a power switch; said power switch being held in closed state by said release member from the time of shutter releasing to at least the time when said electro-magnet is de-energized.

3. An opening and closing means for electric shutters according to claim 1, in which said armature member comprises an armature lever member engageable with said actuating member, an armature plate mounted to said armature lever member, and fixing screws passed through said armature plate and screwed to said armature lever member, the length of portions of said fixing screws to fit said armature plate being larger than the thickness of said armature plate.

* * * * *